US008430473B2

(12) United States Patent
Miyamoto (10) Patent No.: US 8,430,473 B2
(45) Date of Patent: Apr. 30, 2013

(54) LIQUID EJECTION DEVICE AND LIQUID EJECTION METHOD

(75) Inventor: Toru Miyamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 308 days.

(21) Appl. No.: 13/037,741

(22) Filed: Mar. 1, 2011

(65) Prior Publication Data

US 2011/0221816 A1 Sep. 15, 2011

(30) Foreign Application Priority Data

Mar. 11, 2010 (JP) ................................. 2010-054977

(51) Int. Cl.
*B41J 2/205* (2006.01)
(52) U.S. Cl.
USPC .......................................................... 347/15
(58) Field of Classification Search ........................ None
See application file for complete search history.

(56) References Cited

FOREIGN PATENT DOCUMENTS

JP 2003-341065 A 12/2003

*Primary Examiner* — Stephen Meier
*Assistant Examiner* — Tracey McMillion
(74) *Attorney, Agent, or Firm* — Global IP Counselors, LLP (57) ABSTRACT

A liquid ejection device includes first and second heads. A first color conversion table is for converting a tone value of a first color space of a pixel, for which the liquid is ejected from the first head, to a tone value of a second color space corresponding with a color of the liquid, and a second color conversion table is for converting a tone value of the first color space of a pixel, for which the liquid is ejected from the second head, to a tone value of the second color space. For a pixel of an overlapping portion for which the liquid is ejected from the first and second heads, a tone value of the first color space is converted to a tone value of the second color space according to a third color conversion table created based on the first and second color conversion tables.

6 Claims, 9 Drawing Sheets

LIQUID EJECTION DEVICE AND LIQUID EJECTION METHOD

CROSS-REFERENCE TO RELATED APPLICATIONS

This application claims priority to Japanese Patent Application No. 2010-054977 filed on Mar. 11, 2010. The entire disclosure of Japanese Patent Application No. 2010-054977 is hereby incorporated herein by reference.

BACKGROUND

1. Technical Field

The present invention relates to a liquid ejection device and to a liquid ejection method.

2. Related Art

In a case in which an image is formed by a liquid ejection device (e.g., a printer), the color space (RGB color space) of the image data must be converted to the color space (CMYK color space or the like) that corresponds to the liquid (e.g., ink) used by the liquid ejection device. A color conversion table is used for this color space conversion (see Japanese Laid-Open Patent Application Publication No. 2003-341065, for example).

SUMMARY

The printer of Japanese Laid-Open Patent Application Publication No. 2003-341065 is provided with a plurality of heads. When a plurality of heads is used, there is a risk of variation in liquid ejection characteristics between individual heads, due to manufacturing error and other effects. A color conversion table is therefore provided so as to correspond to each head in Japanese Laid-Open Patent Application Publication No. 2003-341065.

However, even when a corresponding color conversion table is used for each head in this manner, color irregularity is prone to occur in the joining portion of the heads.

One object of the present invention is therefore to reduce color irregularity in the joining portion of the heads.

A liquid ejection device according to one aspect of the present invention includes a first head and a second head. The first head includes a plurality of nozzles for ejecting a liquid arranged in a predetermined direction. A first color conversion table is for converting a tone value of a first color space of a pixel, for which the liquid is ejected from the first head, to a tone value of a second color space which corresponds with a color of the liquid. The second head includes a plurality of nozzles for ejecting the liquid arranged in the predetermined direction with the second head at least partially overlapping the first head when viewed in a direction perpendicular to the predetermined direction. The second color conversion table is for converting a tone value of the first color space of a pixel, for which the liquid is ejected from the second head, to a tone value of the second color space. A third color conversion table is created based on the first color conversion table and the second color conversion table so that, for a pixel of an overlapping portion for which the liquid is ejected from the first head and the second head, a tone value of the first color space is converted to a tone value of the second color space according to the third color conversion table.

Other features of the present invention will become more apparent from the present Specification and the accompanying drawings.

BRIEF DESCRIPTION OF THE DRAWINGS

Referring now to the attached drawings which form a part of this original disclosure.

DETAILED DESCRIPTION OF EXEMPLARY EMBODIMENTS

At least the items below will be made clear by the description of the present Specification and the accompanying drawings.

Made clear is a liquid ejection device characterized in comprising a first head in which a plurality of nozzles for ejecting a liquid is arranged in a predetermined direction; a first color conversion table for converting a tone value of a first color space of a pixel, for which liquid is ejected from the first head, to a tone value of a second color space which corresponds with the color of the liquid; a second head in which a plurality of nozzles for ejecting the liquid is arranged in the predetermined direction, the second head being positioned in the predetermined direction so as to at least partially overlap with the first head; and a second color conversion table for converting the tone value of the first color space of a pixel, for which liquid is ejected from the second head, to a tone value of the second color space; wherein a third color conversion table is created based on the first color conversion table and the second color conversion table, and for a pixel of an overlapping portion for which liquid is ejected from the first head and the second head, the tone value of the first color space is converted to a tone value of the second color space according to the third color conversion table.

The liquid ejection device such as described above makes it possible to reduce color irregularity in the joining portion of the first head and second head.

In the liquid ejection device, the third color conversion table may be created by averaging the conversion amount according to the first color conversion table and the conversion amount according to the second color conversion table.

Through such a liquid ejection device, color irregularity can be made less noticeable.

In the liquid ejection device, the third color conversion table may be created by weighting the conversion amount according to the first color conversion table and the conversion amount according to the second color conversion table in accordance with the ratio at which liquid is ejected from the first head and the second head.

Through such a liquid ejection device, color irregularity can be made even less noticeable.

In the liquid ejection device, a configuration is preferably adopted in which the ejection ratio of the first head decreases and the ejection ratio of the second head increases from one side to the other side in the predetermined direction in the overlapping portion.

Through such a liquid ejection device, it is possible to prevent sharp variations in density in the joining portion.

In the liquid ejection device, a configuration is preferably adopted in which the ejection ratio is changed so that in a case in which certain nozzles of the overlapping portion of the first head do not eject liquid, more liquid is ejected from the nozzles on the one side than from the certain nozzles of the first head, and when the third color conversion table is created, the weighting of the first color conversion table and the second color conversion table is changed in accordance with the changed ejection ratio.

Through such a liquid ejection device, it is possible to prevent image quality from being degraded by non-discharging nozzles.

Also made clear is a liquid ejection method for a liquid ejection device comprising a first head in which a plurality of nozzles for ejecting a liquid is arranged in a predetermined direction; and a second head in which a plurality of nozzles for ejecting the liquid is arranged in the predetermined direction, the second head being positioned in the predetermined direction so as to at least partially overlap with the first head; the liquid ejection method characterized in comprising the steps of converting the tone value of a first color space of a pixel, for which liquid is ejected from the first head, to a tone value of a second color space corresponding with the color of the liquid, according to a first color conversion table; converting the tone value of the first color space of a pixel, for which liquid is ejected from the second head, to a tone value of the second color space according to a second color conversion table; creating a third color conversion table based on the first color conversion table and the second color conversion table; and converting the tone value of the first color space for a pixel of an overlapping portion, for which liquid is ejected from the first head and the second head, to a tone value of the second color space according to the third color conversion table.

An inkjet printer (also referred to below as the printer 1) will be described as an example in the embodiment below.

First Embodiment

Printing System

A printing system will first be described with reference to the drawings.

Figure 1:
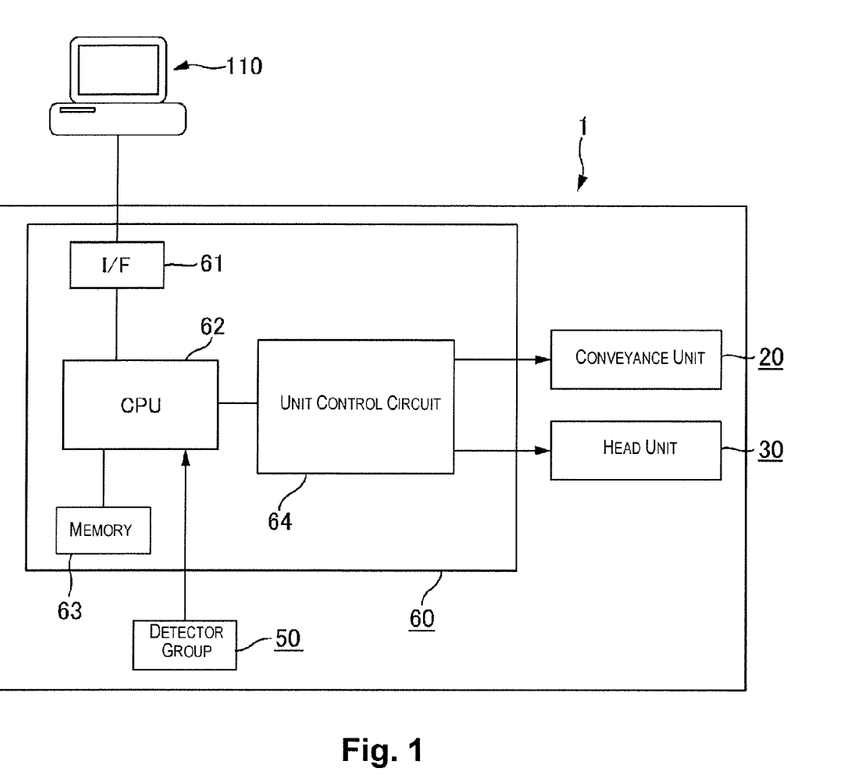
FIG. 1 is a block diagram showing the printing system according to the present embodiment.

FIG. 1 is a block diagram showing the printing system of the present embodiment. This printing system is provided with a printer 1 and a computer 110. The printer 1 is a device for printing an image on paper, cloth, film, or another medium. The computer 110 is electrically connected to the printer 1, and outputs printing data which corresponds to an image to be printed to the printer 1 in order to cause the printer 1 to print the image.

A printer driver is installed in the computer 110. The printer driver is a program for realizing a function for causing a display or other display device (not shown) to display a user interface, and for realizing a function for converting image data, outputted from an application program, to printing data. The printer driver is recorded on a flexible disk FD, CD-ROM, or other recording medium (computer-readable recording medium). Alternatively, the printer driver can be downloaded to the computer 110 via the Internet. The program is composed of code for realizing various functions.

The term "printing device (liquid ejection device)" means the printer 1, in a narrow sense, and means the system composed of the printer 1 and the computer 110, in a broad sense.

Configuration of the Printer

Figure 2:
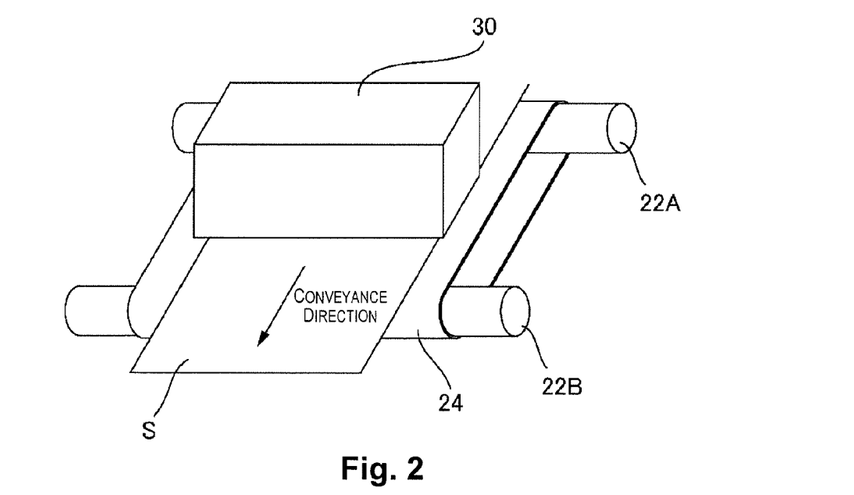
FIG. 2 is a perspective view showing the manner in which the printer conveys paper S.

The configuration of the printer 1 according to the present embodiment will be described below with reference to FIGS. 1 and 2. FIG. 2 is a perspective view showing the manner in which the printer 1 conveys paper S.

The printer 1 of the present embodiment has a conveyance unit 20, a head unit 30, a detector group 50, and a controller 60. In the printer 1, which receives printing data from the computer 110 as an external device, each unit (conveyance unit 20, head unit 30) is controlled by the controller 60, and an image is printed on a medium (e.g., paper) in accordance with the printing data. Conditions within the printer 1 are monitored by the detector group 50, and the detector group 50 outputs detection results to the controller 60. The controller 60 controls each unit based on the detection results outputted from the detector group 50.

The conveyance unit 20 conveys the medium (e.g., paper S or the like) in a predetermined direction (referred to below as the conveyance direction). The conveyance unit 20 has an upstream roller 22A, a downstream roller 22B, and a belt 24. When a conveyance motor not shown in the drawing rotates, the upstream roller 22A and downstream roller 22B rotate, and the belt 24 rotates. The fed paper S is conveyed by the belt 24 to a region where printing can be performed (region facing the head unit 30). The belt 24 conveys the paper S, and the paper S is thereby moved in the conveyance direction with respect to the head unit 30. The paper S during conveyance adheres to the belt 24 by electrostatic adhesion or vacuum adhesion.

The head unit 30 ejects ink (a type of liquid) to the medium. The head unit 30 ejects ink to the paper S which is being conveyed, and thereby forms dots on the paper S and prints an image on the paper S. The printer 1 of the present invention is a line printer, and the head unit 30 is capable of forming dots as wide as the paper at one time. The head unit 30 will be described in detail hereinafter.

A rotary encoder (not shown), a paper detection sensor (not shown), and other components are included in the detector group 50. The rotary encoder is capable of detecting the amount of conveyance of the paper S by the conveyance unit 20. The paper detection sensor detects the position of the distal end of the paper S being fed.

The controller 60 is a control unit for controlling the printer. The controller 60 has an interface unit 61, a CPU 62, a memory 63, and a unit control circuit 64. The interface unit 61 transmits and receives data with respect to the printer 1 and the computer 110, which is an external device. The CPU 62 is a computational processing device for controlling the printer as a whole. The memory 63 maintains a region for storing a program for the CPU 62, an operating region, and other regions, and has a RAM, EEPROM, or other storage element. The CPU 62 controls each unit via the unit control circuit 64 in accordance with a program stored in the memory 63.

Printing Processing

In the printer 1 such as described above, when the controller 60 receives printing data, the controller 60 first causes the conveyance unit 20 to rotate a paper feed roller (not shown) to send the paper S to be printed onto the belt 24. The paper S is conveyed on the belt 24 at a constant speed without stopping, and passes under the head unit 30. While the paper S passes under the head unit 30, ink is continuously ejected from nozzles of a head of the head unit 30. In other words, dot formation and conveyance of the paper S are performed simultaneously. As a result, dot rows composed of a plurality of dots are formed along the conveyance direction and the paper width direction on the paper S, and an image is printed. Lastly, the controller 60 discharges the paper S at the end of printing.

Head Unit

Figure 3:
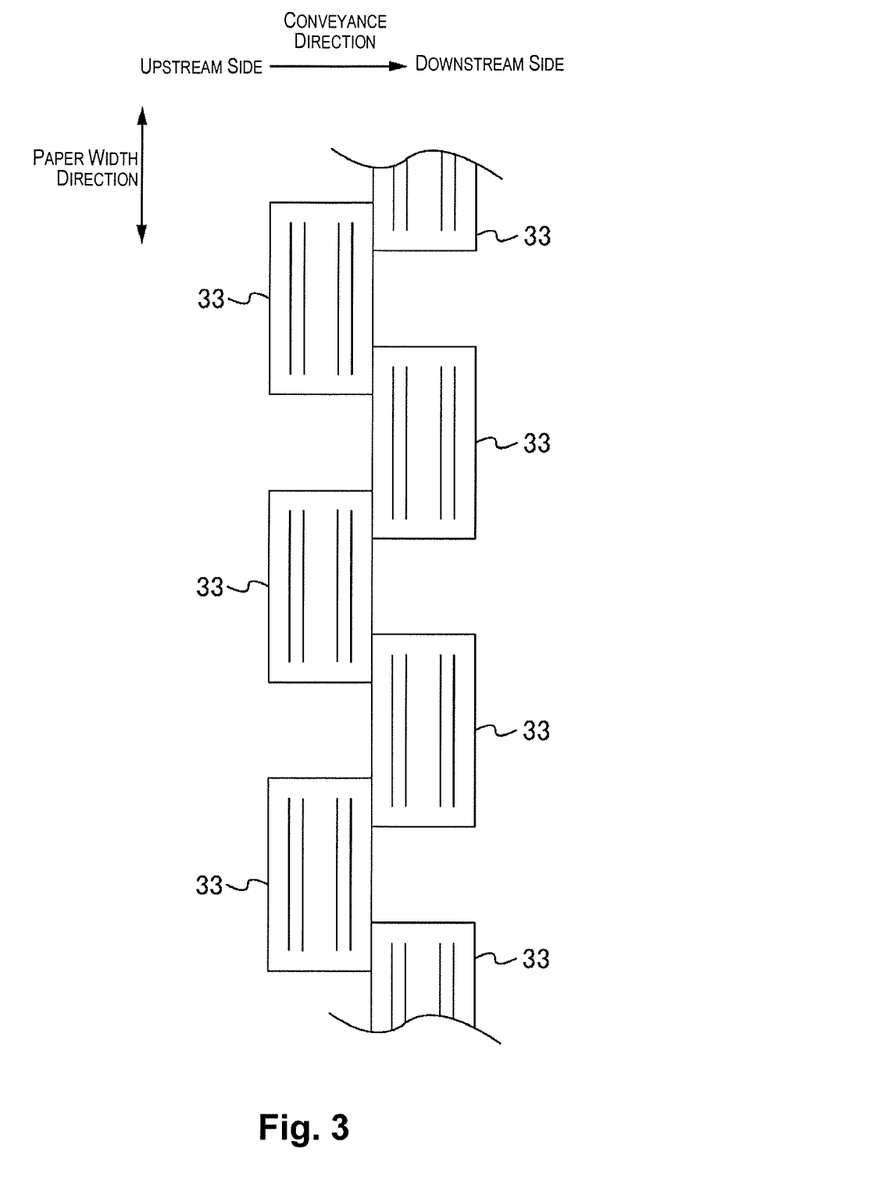
FIG. 3 is a view showing the placement of the plurality of heads on the bottom surface of the head unit.

FIG. 3 is a view showing the placement of the plurality of heads on the bottom surface of the head unit 30. As shown in FIG. 3, a plurality of heads 33 is arranged in a zigzag pattern in the paper width direction. Although not shown in the drawing, a black ink nozzle row, a cyan ink nozzle row, a magenta ink nozzle row, and a yellow ink nozzle row are formed in each head. Each nozzle row is provided with a plurality of nozzles for ejecting ink. The plurality of nozzles of each nozzle row is arranged at a fixed nozzle pitch in the paper width direction.

Figure 4:
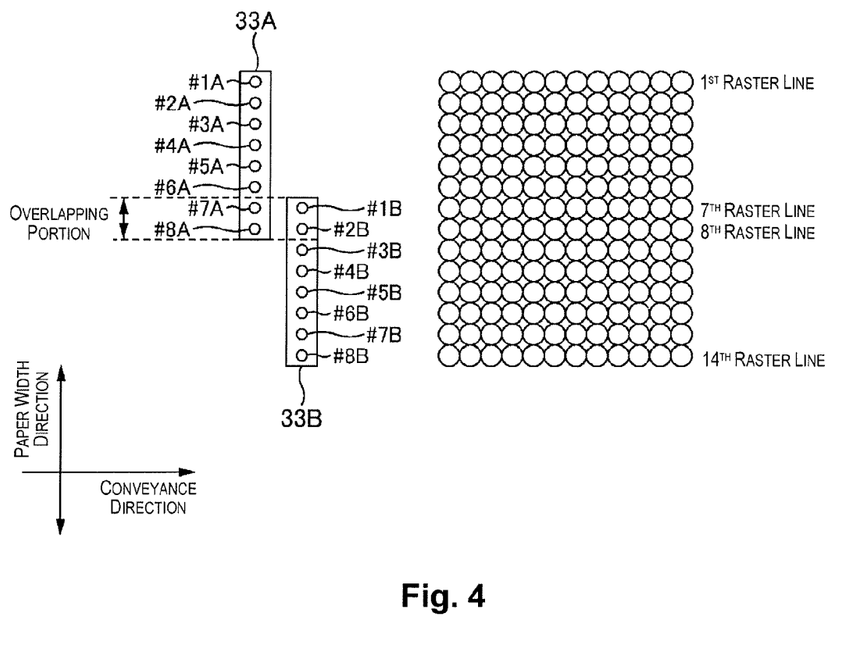
FIG. 4 is a view showing the head placement and dot formation in a manner which simplifies the description.

FIG. 4 is a view showing the head placement and dot formation in a manner which simplifies the description. In order to simplify the description, the head unit 30 in FIG. 4 is composed of two heads (first head 33A, second head 33B). Also to simplify the description, only one nozzle row (e.g., the yellow ink nozzle row) is provided to each head. Also to simplify the description, the nozzle row of each head is provided with eight nozzles.

A number is assigned to the nozzles of each head in sequence from the top of the drawing. As shown in FIG. 4, the first head 33A and the second head 33B are positioned in the paper width direction so as to partially overlap (overlapping portion). For example, nozzle #7A of the first head 33A is at the same position in the paper width direction as nozzle #1B of the second head 33B. Nozzle #8A of the first head 33A is also at the same position in the paper width direction as nozzle #2B of the second head 33B.

A row of dots arranged in the direction of relative movement of the head and the paper is referred to as a "raster line." In a line printer such as that of the present embodiment, a "raster line" is a row of dots arranged in the conveyance direction of the paper. On the other hand, in the case of a serial printer in which printing is performed by a head mounted to a carriage, a "raster line" is a row of dots arranged in the movement direction of the carriage, and a printed image is formed by arranging numerous raster lines in the direction perpendicular to the movement direction. As shown in FIG. 4, the raster line in the nth position is referred to as the "nth raster line."

In the case of FIG. 4, ink droplets are continuously ejected from the nozzles to the paper S being conveyed, and fourteen raster lines are thereby formed on the paper in the conveyance direction. For example, a first raster line is formed on the paper by nozzle #1A of the first head 33A. A fourteenth raster line is formed on the paper by nozzle #8B of the second head 33B. A seventh raster line is formed by nozzle #7A of the first head 33A and nozzle #1B of the second head 33B. An eighth raster line is formed by nozzle #8A of the first head 33A and nozzle #2B of the second head 33B.

Overview of Processing by the Printer Driver

Figure 5:
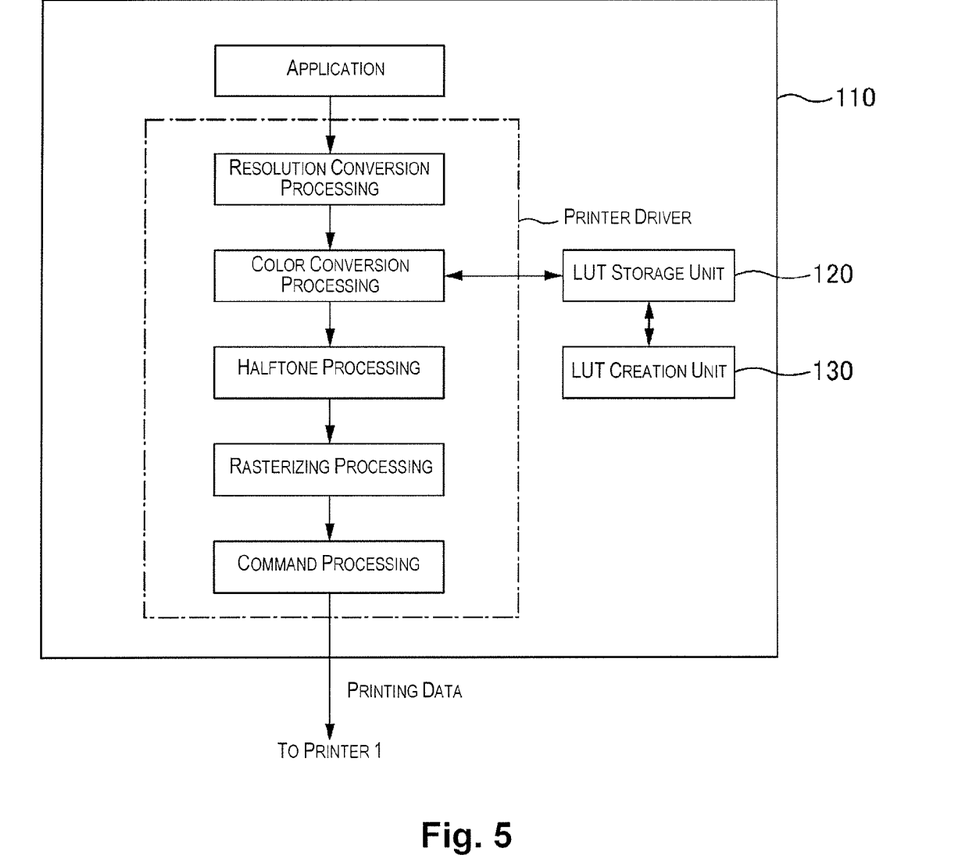
FIG. 5 is a view showing the processing performed by the printer driver.

As previously mentioned, the printing processing described above is initiated when printing data are transmitted from the computer 110 which is connected to the printer 1. The printing data are created by processing by the printer driver. The processing performed by the printer driver will be described below with reference to FIG. 5. FIG. 5 is a view showing the processing performed by the printer driver.

The printer driver receives image data from an application program, converts the image data to printing data which are in a format that can be interpreted by the printer 1, and outputs the printing data to the printer. When converting the image data from the application program to printing data, the printer driver performs resolution conversion processing, color conversion processing, halftone processing, rasterizing processing, command tagging processing, and other processing.

Resolution conversion processing is processing for converting the image data (text data, image data, or the like) outputted from the application program to the resolution (printing resolution) of printing on the paper. For example, in a case in which the printing resolution is specified as 720×720 dpi, the vector-format image data received from the application program are converted to bitmap-format image data having a resolution of 720×720 dpi. The image data in the image data after resolution conversion processing are multiple-tone (e.g., 256 tones) RGB data expressed by an RGB color space (corresponding to the first color space). The tone values thereof are determined based on RGB image data.

Color conversion processing is processing for converting the RGB data to data in a CMYK color space (corresponding to the second color space). Image data of the CMYK color space are data which correspond to the colors of ink provided to the printer. In other words, the printer driver creates CMYK-plane image data based on the RGB data.

This color conversion processing is performed based on a table in which the tone values of the RGB data and the tone values of the CMYK data are correlated. This table is referred to as a color conversion look up table (LUT). The image data after color conversion processing are 256-tone CMYK data expressed by a CMYK color space.

Halftone processing is processing for converting data which have a high number of tones into data which have a number of tones that can be formed by the printer. Through this halftone processing, data which indicate 256 tones are converted to 1-bit data which indicate two tones, or 2-bit data which indicate four tones. In the image data after halftone processing, 1-bit or 2-bit pixel data correspond to each pixel, and the pixel data are data which indicate the dot formation conditions (presence of a dot, size of the dot) in each pixel. In the case of 2-bit data (four tones), for example, the data are converted to four levels in which no dot is formed for a dot tone value of [00], a small dot is formed for a dot tone value of [01], a mid-sized dot is formed for a dot tone value of [10], and a large dot is formed for a dot tone value of [11]. After a dot creation ratio is then determined for each size of dot, a dither method, γ correction, error diffusion, or other method is utilized to create image data so that the printer 1 disperses the formation of dots.

Rasterizing processing sorts pixel data which are arranged in a matrix into the data sequence for transfer to the printer 1 for each item of pixel data. For example, the pixel data are sorted in accordance with the sequence in which nozzles are arranged in each head.

Command tagging processing is processing for tagging rasterized data with command data that correspond to a printing scheme. Command data include conveyance data for indicating the conveyance speed of the medium, for example.

The printing data created through the processing described above are transmitted to the printer 1 by the printer driver.

As shown in FIG. 5, the computer 110 has a LUT storage unit 120 and a LUT creation unit 130.

The color conversion LUT used in color conversion processing from the RGB color space to the CMYK color space is stored in the LUT storage unit 120. In the present embodiment, the LUT storage unit 120 stores a color conversion LUT for each head of the head unit 30, or a synthetic LUT (described hereinafter) created by the LUT creation unit 130 based on the color conversion LUT for each head. The color conversion LUT stored in the LUT storage unit 120 is read and used during color conversion processing by the printer driver.

The LUT creation unit 130 creates the color conversion LUT of each head based on the results of colorimetry of a test pattern that is printed using each head, for example. As described hereinafter, the LUT creation unit 130 of the present embodiment synthesizes the color conversion LUT of each head to create a synthetic LUT for use in color-converting the overlapping portion of the heads.

Color Conversion LUT

A color conversion LUT is used in color conversion processing, as described above. A color conversion LUT is a table in which a relationship whereby data of a certain color space correspond to data of another color space is defined for a plurality of grid points. The color conversion LUT of the present embodiment is a three-dimensional color conversion table for converting the tone values of image data in an RGB color space to tone values of a color space (CMYK color space in the present embodiment) that corresponds to the ink used by the printer 1.

Figure 6:
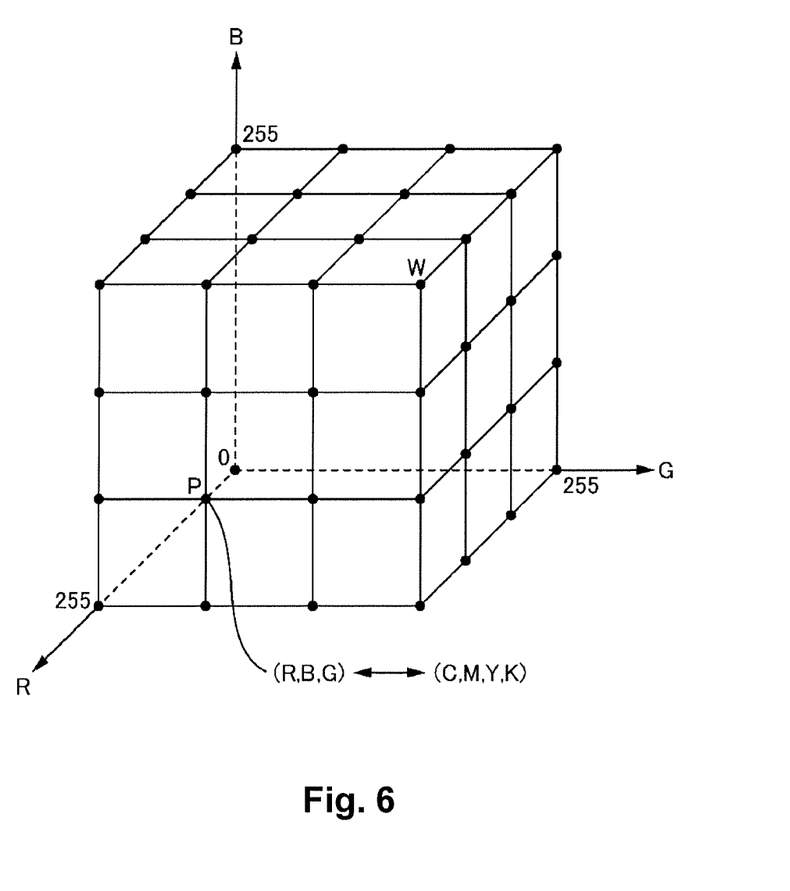
FIG. 6 is a schematic view showing the color conversion LUT.

FIG. 6 is a schematic view showing the color conversion LUT. The origin point of the diagram is black (K), and a color space is formed by the R axis, G axis, and B axis. Each point in this color space can be represented by coordinates (R, G, B). There are 256 tones (0 through 255) each for R, G, and B, and white (W) is at the coordinates (255, 255, 255).

In the present embodiment, grid points are provided in the three-dimensional color space so as to divide each axis into three parts. In other words, four grid points are provided for each axis. Tone values for each color of the CMYK color space are also specified so as to correspond to the coordinates (R, G, B) of grid points of the three-dimensional color space shown. For example, the coordinates (R, G, B) of grid point P in FIG. 6 are (255, 85, 85), and predetermined tone values (C, M, Y, K) of the CMYK color space are associated with grid point P.

Through the use of such a color conversion LUT, the tone values of the RGB color space can be converted to tone values of the CMYK color space that corresponds to the ink used by the printer 1. In a case in which a value of the image data is not positioned at a grid point, the corresponding tone value of the CMYK color space can be computed by three-dimensional interpolation based on the relationship of correspondence between the RGB color space and the CMYK color space for the surrounding grid points.

A plurality of heads is provided in the present embodiment. When a plurality of heads is used in this manner, there is a risk of variation in ink ejection characteristics between individual heads, due to manufacturing error and other effects. A corresponding color conversion LUT is therefore provided for each head used in the present embodiment.

However, even when a color conversion table is provided for each head, when there is a portion (overlapping portion) at which a raster line is formed by a plurality of heads, as shown in FIG. 4, there is a risk of color irregularity at the overlapping portion.

A configuration is therefore adopted in the present embodiment whereby a synthetic LUT (which corresponds to the third color conversion table) is created based on the color conversion LUT of each head. Color conversion from tone values of the RGB color space to tone values of the CMYK color space is then performed by the synthetic LUT for the pixel data (e.g., the pixel data of the seventh raster line and eighth raster line in the case shown in FIG. 4) of the joining portion (overlapping portion) of the heads.

Color Conversion LUT Synthesis

Figure 7:
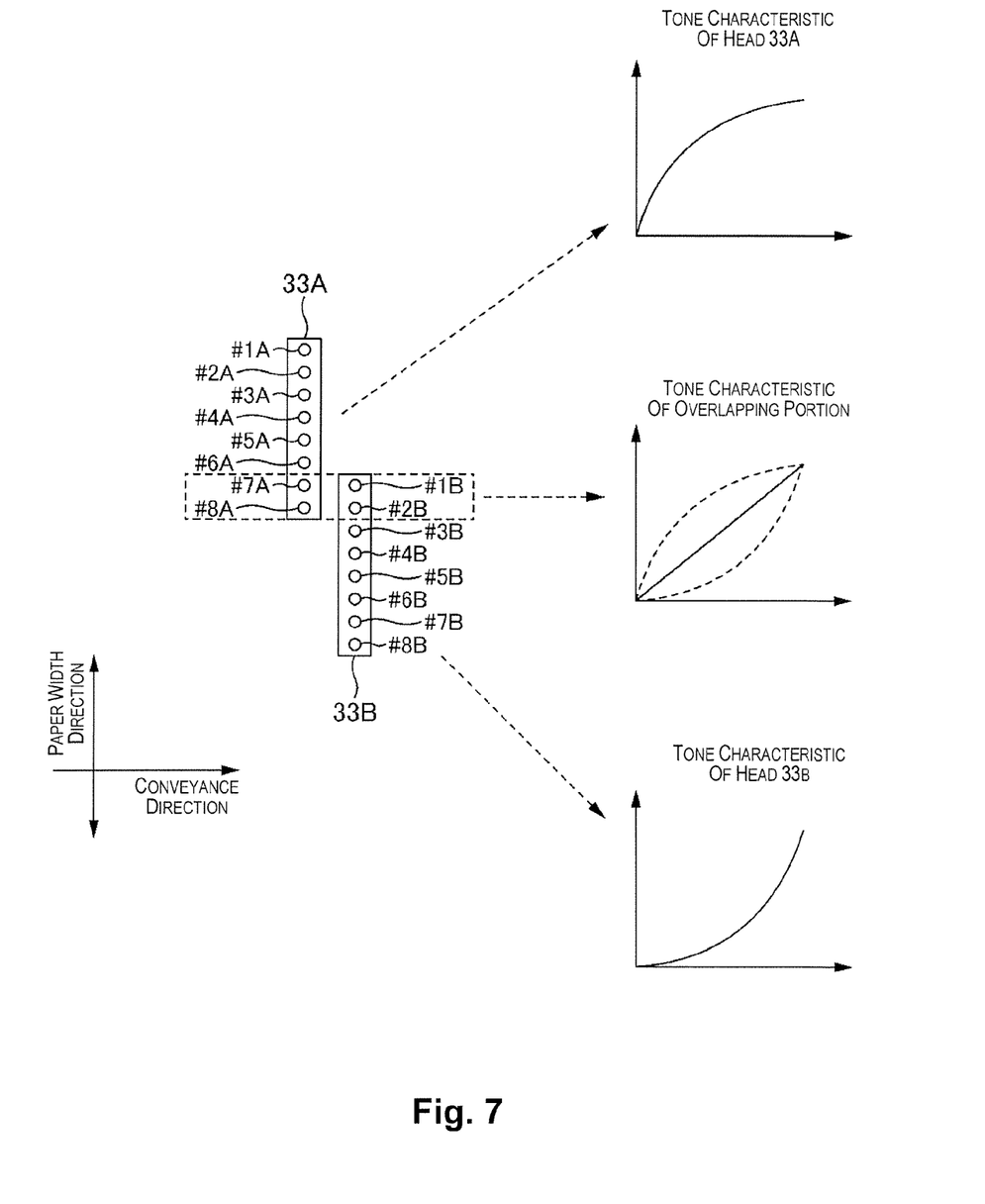
FIG. 7 is a view showing an overview of the present embodiment.

The color conversion LUT synthesis of the present embodiment will be described with reference to FIGS. 4 through 7. FIG. 7 shows an overview of the present embodiment. On the right side of FIG. 7 are views showing the tone characteristics of the heads, where the input tone values are shown on the horizontal axis, and the output tone values are shown on the vertical axis. In the present embodiment, a first color conversion LUT1 (referred to simply as LUT1 below) is provided which corresponds to the first head 33A, and a second color conversion LUT2 (referred to simply as LUT2 below) is provided which corresponds to the second head 33B. LUT1 and LUT2 are stored in the LUT storage unit 120.

As shown in FIG. 4, in a case in which there is an overlapping portion of the first head 33A and second head 33B, the LUT creation unit 130 reads LUT1 and LUT2 stored in the LUT storage unit 120. The LUT creation unit 130 then creates a synthetic LUT by averaging the conversion amount based on LUT1 and the conversion amount based on LUT2.

For example, a case is supposed in which the values (C, M, Y, K) after color conversion processing of a certain grid point (R, G, B) in each color conversion LUT (see FIG. 6) are (100, 128, 0, 10) in LUT1, and are (110, 130, 6, 16) in LUT2. The LUT creation unit 130 calculates the average value of the after-conversion values of LUT1 and LUT2. In the case of cyan (C), for example, (100+110)/2=105. Average values are computed in the same manner for M, Y, and K. From the results of this computation, the after-conversion values of the grid point (R, G, B) are (105, 129, 3, 13). After-conversion CMYK values are computed for other grid points as well by averaging LUT1 and LUT2 in the same manner.

The LUT creation unit 130 thus computes the average of LUT1 and LUT2 for all grid points and creates a LUT (synthetic LUT) in which the tone values of the RGB color space and the tone values of the CMYK color space are correlated. The created synthetic LUT is stored in the LUT storage unit 120.

During color conversion processing by the printer driver, conversion from tone values of the RGB color space to tone values of the CMYK color space is performed by LUT1 for the pixels of the portion (first raster line to sixth raster line in FIG. 4) in which dots are formed by only the first head 33A. Conversion from tone values of the RGB color space to tone values of the CMYK color space is performed by LUT2 for the pixels of the portion (ninth raster line to fourteenth raster line in FIG. 4) in which dots are formed by only the second head 33B. Conversion from tone values of the RGB color space to tone values of the CMYK color space is performed by the synthetic LUT for pixels of the overlapping portion (seventh raster line, eighth raster line) in which dots are formed by the first head 33A and second head 33B.

In a case when color conversion processing is performed by using corresponding LUTs (LUTs having difference output values for the same input value) for each head in the overlapping portion, the difference in density between pixels formed by dots of the first head 33A and pixels formed by dots of the second head 33B increases as indicated by the dashed lines in the view of the overlapping portion in FIG. 7, and there is a risk of color irregularity.

In the present embodiment, a synthetic LUT is created in which LUT1 corresponding to the first head 33A and LUT2 corresponding to the second head 33B are averaged, and color conversion is performed by the synthetic LUT for the overlapping portion of the first head 33A and second head 33B. The difference in the density of the image formed by each head, as indicated by the solid line in the view of the overlapping portion in FIG. 7, can thereby be made less noticeable, and color irregularity in the joining portion (overlapping portion) of the heads can be reduced.

Second Embodiment

In the first embodiment, a synthetic LUT is created by averaging the LUTs (LUT1 and LUT2) that correspond to each head. In the second embodiment, a synthetic LUT is created by weighting LUT1 and LUT2 in accordance with the usage ratio of the first head 33A and second head 33B in each raster line.

Figure 8:
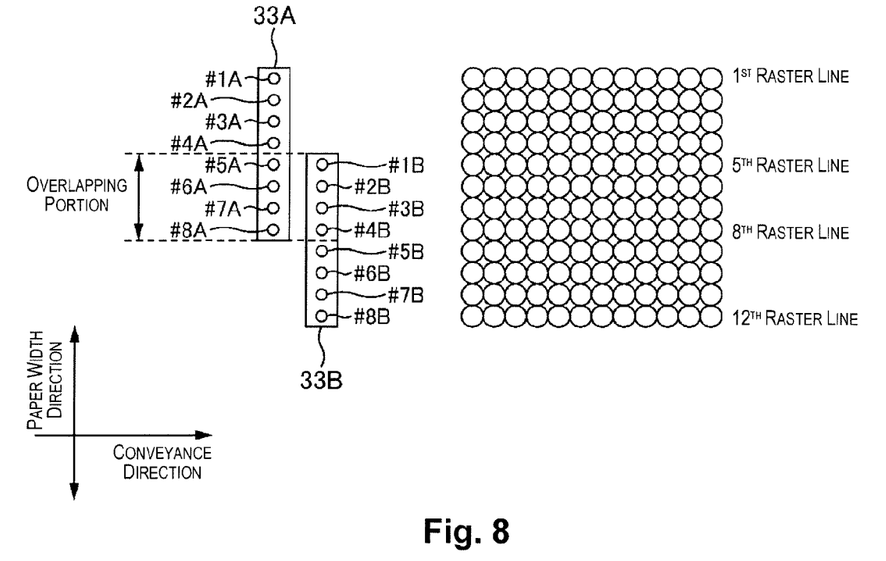
FIG. 8 is a view showing the head placement and dot formation in a second embodiment.

FIG. 8 is a view showing the head arrangement and dot formation in the second embodiment. In the second embodiment, there are four nozzles in the overlapping portion. All other aspects of the configuration of the second embodiment are the same as in the first embodiment, and no description of such aspects will be given. In the second embodiment, ink droplets are continuously ejected from the nozzles to the paper S being conveyed, and twelve raster lines are thereby formed on the paper in the conveyance direction. The fifth raster line through eighth raster line constitute the overlapping portion in the second embodiment, and for the pixels of the overlapping portion, dots are formed by nozzles of the first head 33A and nozzles of the second head 33B.

Figure 9:
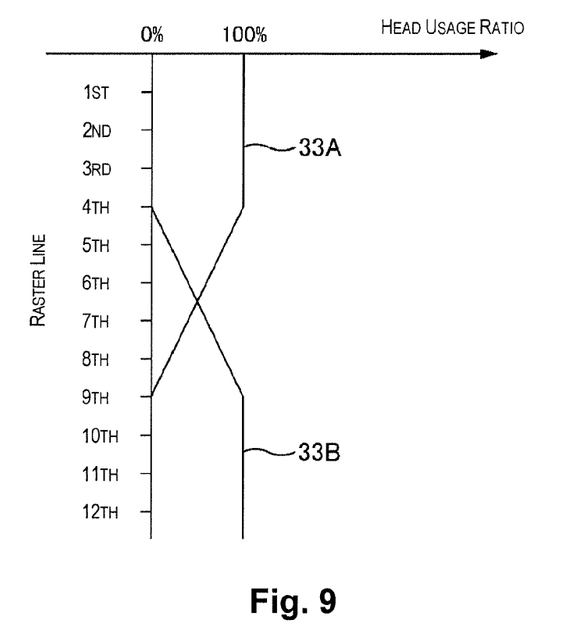
FIG. 9 is a view showing the usage ratio of the first head in the second embodiment.

FIG. 9 is a view showing the usage ratios of the heads in the second embodiment. The raster lines are shown on the vertical axis of FIG. 9. The usage ratios of the first head 33A and second head 33B are shown on the horizontal axis of FIG. 9. For example, the usage ratio of the first head 33A is 100% for the first raster line through fourth raster line. The first raster line through fourth raster line are thereby composed only of dots formed by the first head 33A. In the fifth raster line, the usage ratio of the first head 33A is 80%, and the usage ratio of the second head 33B is 20%. In other words, for pixels of the fifth raster line, the probability of the dots being formed by the first head 33A is 80%, and the probability of the dots being formed by the second head 33B is 20%.

The usage ratio of the first head 33A is 60% in the sixth raster line, 40% in the seventh raster line, 20% in the eighth raster line, and 0% in the ninth raster line through twelfth raster line.

In the second embodiment, during creation of the synthetic LUT for the overlapping portion, the conversion amount based on LUT1 is weighted according to the usage ratio of the first head 33A at the time the raster line is formed, and the conversion amount based on LUT2 is weighted according to the usage ratio of the second head 33B at the time the raster line is formed. A synthetic LUT is thus created for each nozzle position (raster line).

For example, in the fifth raster line, the usage ratio of the first head 33A is 80%, and the usage ratio of the second head 33B is 20%. The LUT creation unit 130 thereby creates a synthetic LUT in which the conversion amount based on LUT1 is weighted by 80%, and the conversion amount based on LUT2 is weighted by 20%.

In the same manner, for the sixth raster line, a synthetic LUT is created in which the conversion amount based on LUT1 is weighted by 60%, and the conversion amount based on LUT2 is weighted by 40%. For the seventh raster line, a synthetic LUT is created in which the conversion amount based on LUT1 is weighted by 40%, and the conversion amount based on LUT2 is weighted by 60%, and for the eighth raster line, a synthetic LUT is created in which the conversion amount based on LUT1 is weighted by 20%, and the conversion amount based on LUT2 is weighted by 80%.

In the color conversion processing of the overlapping portion, color conversion of tone values of the RGB color space to tone values of the CMYK color space is performed by the synthetic LUT created for each raster line.

Figure 10:
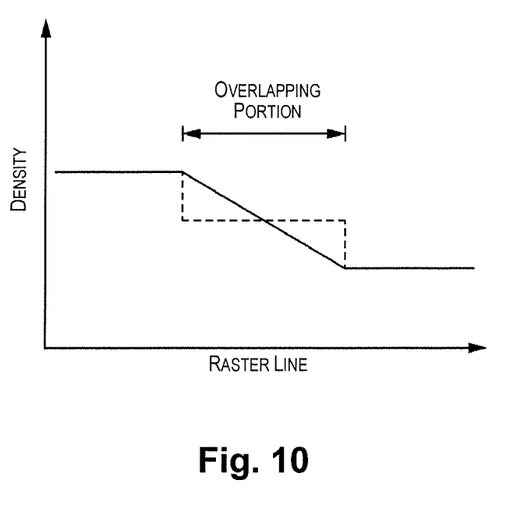
FIG. 10 is a conceptual view of an image printed by the second embodiment.

FIG. 10 is a conceptual view showing the image printed by the second embodiment. The raster line is shown on the horizontal axis, and the density is shown on the vertical axis. In the overlapping portion shown in FIG. 10, the dashed line indicates a case in which the synthetic LUT created by averaging LUT1 and LUT2 is used for printing, and the solid line indicates a case on which a synthetic LUT created by weighting according to the usage ratio of each head as described above is used for printing.

As shown in FIG. 10, the dashed line indicates that a level difference occurs in the density (the density abruptly changes) at the boundary portions of the overlapping portion, and the solid line (present embodiment) indicates that the change in density is gradual.

By weighting the corresponding LUT according to the usage ratio of each head during creation of the synthetic LUT, the change in density in the overlapping portion can be made gradual, and color irregularity can therefore be made less noticeable.

Third Embodiment

In each head, nozzles which do not eject ink (also referred to below as non-ejecting nozzles) sometimes occur due to blockage, for example, or other effects. When a non-ejecting nozzle occurs among the nozzles of the overlapping portion, there is a risk of color irregularity being noticeable even when color conversion is performed by a synthetic LUT in which the LUTs corresponding to each head are weighted in the manner described in the second embodiment.

Therefore, in the third embodiment, the processing for synthesizing a LUT is changed when there is a non-ejecting nozzle in the overlapping portion.

Figure 11:
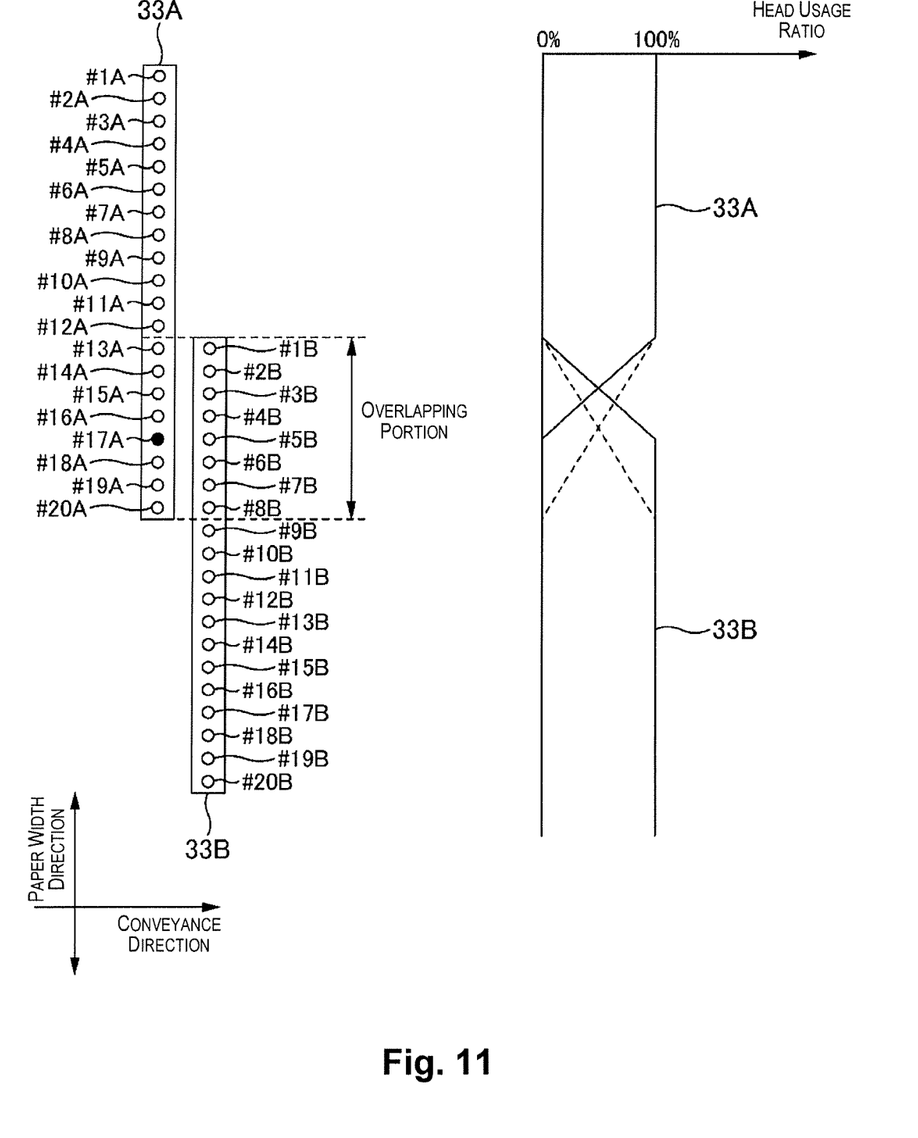
FIG. 11 is a view showing a third embodiment.

FIG. 11 is a view showing the third embodiment. On the left side of FIG. 11 is a view showing the positional relationship between the first head 33A and the second head 33B, and on the right side of FIG. 11 is a view showing the usage ratio of each head. The nozzle colored black among the nozzles of the heads shown on the left side of FIG. 11 is a non-ejecting nozzle. In FIG. 11, nozzle #17A of the first head 33A is a non-ejecting nozzle. The dashed lines on the right side of FIG. 11 indicate the usage ratios prior to application of the third embodiment, and the solid lines indicate the usage ratios after application of the third embodiment.

As shown in FIG. 11, there are 20 nozzles in each head in the third embodiment. Nozzles #13A through #20A of the first head 33A are in the same position in the paper width direction as nozzles #1B through #8B of the second head 33B (overlapping portion). In other words, there are eight nozzles in the overlapping portion in the third embodiment. All other aspects of the configuration of the third embodiment are the same as in the embodiments described above, and no description of such aspects will be given. In the third embodiment, ink droplets are continuously ejected from the nozzles to the paper S being conveyed, and 32 raster lines are thereby formed on the paper in the conveyance direction. For example, the first raster line is formed on the paper by nozzle #1A of the first head 33A. The 32nd raster line is formed on the paper by nozzle #20B of the second head 33B. The raster lines of the overlapping portion are formed by nozzles of the first head 33A and nozzles of the second head 33B.

The on the dashed lines of FIG. 11, the usage ratio of nozzle #17 of the first head 33A is approximately 40% (the usage ratio of the second head 33B is approximately 60%). When nozzle #17 of the first head 33A is a non-ejecting nozzle, the seventeenth raster line is formed by only about half of the dots formed by the second head 33B. In this case, even when the synthetic LUT weighted according to the usage ratio of each head is created, there is a risk of color irregularity or banding.

Therefore, in the present embodiment, in a case in which there is a non-ejecting nozzle in one of the heads in the overlapping portion, the usage ratio is changed so that the non-ejecting nozzle is not included, and the weighting applied when creating the synthetic LUT is changed according to the changed usage ratio.

For example, in a case in which nozzle #17A of the first head 33A is a non-ejecting nozzle, as shown in FIG. 11, the usage ratio of the first head 33A is changed (as indicated by the solid line in FIG. 11) so that nozzles (nozzle #13A through nozzle #16A) having lower numbers in the overlapping portion than the non-ejecting nozzle are used. In other words, in the first head 33A, nozzles having higher numbers than nozzle #17A (the non-ejecting nozzle) are not used. In this case, since the usage ratio of the first head 33A for the overlapping portion suddenly decreases relative to before the change, the usage ratio of the second head 33B suddenly increases as the nozzle number increases, as indicated by the solid line in FIG. 11. The usage ratio is then 100% for nozzle #5B of the second head 33B, which is at the same position in the paper width direction as the non-ejecting nozzle (nozzle #17A).

A synthetic LUT is subsequently created for each raster line by weighting LUT1 and LUT2 according to the changed usage ratio of each head, in the same manner as in the previously described embodiment.

Through this configuration, in the seventeenth raster line, which corresponds to nozzle #17 (the non-ejecting nozzle) of the first head 33A, for example, nozzle #5B of the second head 33B is used at a ratio of 100%, and only LUT2 corresponding to the second head 33B is used during color conversion. The non-ejecting nozzle therefore has no effect on image quality.

By thus changing the usage ratio, and correspondingly changing the weighting of the synthetic LUT when there is a non-ejecting nozzle in the overlapping portion, it is possible to prevent degradation of image quality due to failure of dots to be formed by the non-ejecting nozzle, and eliminate the appearance of color irregularity or banding in the overlapping portion.

Other Embodiments

A printer or the like was described above in the embodiments, but the embodiments described above are merely for facilitating understanding of the present invention, and are not to be construed as limiting the present invention. The present invention can be modified and improved within the intended scope thereof, and equivalent techniques are also included by the present invention. The embodiments described below in particular are included in the present invention.

Liquid Ejection Device

An inkjet printer is described as an example of the liquid ejection device in the above embodiments. However, the liquid ejection device is not limited to an inkjet printer, and the liquid ejection device may also eject a fluid (liquid, liquid body in which particles of a functional material are dispersed, or a fluid such as a gel) other than ink. For example, the same techniques as those of the embodiments described above may be applied to various types of devices which utilize an inkjet technique, such as color filter manufacturing devices, dyeing devices, micro-fabrication devices, semiconductor manufacturing devices, surface processing devices, three-dimensional modeling devices, vaporization devices, organic EL manufacturing devices (particularly polymer EL manufacturing devices), display manufacturing devices, film formation devices, and DNA chip manufacturing devices. These methods and manufacturing methods are also within the range of application of the present invention.

The printer of the embodiments described above was described as a line printer, but a printer (so-called serial printer) may also be used which prints an image composed of dots on paper by repeatedly alternating a conveyance process for conveying a medium in a conveyance direction, and a dot formation process for ejecting ink droplets from nozzles of a head while moving a carriage in a movement direction which intersects with the conveyance direction.

Ink

Since the embodiments described above were of a printer, ink was ejected from the nozzles, but this ink may be water based or oil based. The liquid ejected from the nozzles is also not limited to ink. For example, a metallic material, organic material (particularly a polymer material), magnetic material, conductive material, wiring material, film formation material, electronic ink, working fluid, or liquid including a genetic solution or the like (also including water) may be ejected from the nozzles.

Ink Ejection Scheme

The ink ejection scheme for ejecting the ink from the nozzles of the heads of the printer 1 may be a piezo scheme whereby an ink chamber is expanded or contracted by the driving of a piezo element, or a thermal scheme whereby a heating element is used to create a bubble in a nozzle and the ink is ejected by the bubble.

Printer Driver

The printer driver processing shown in FIG. 5 may be performed at the printer. In this case, a printing device is composed of a printer and a PC which has the printer driver installed therein.

Head Usage Ratio

The usage ratio of the first head 33A is varied in linear fashion in the second and third embodiments, but this configuration is not limiting. For example, the usage ratio may sometimes be the same in adjacent nozzles. However, when the usage ratio is varied in linear fashion as in the present embodiments, color irregularity can be made less noticeable.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid ejection device comprising:
   a first head including a plurality of nozzles for ejecting a liquid arranged in a predetermined direction;
   a first color conversion table for converting a tone value of a first color space of a pixel, for which the liquid is ejected from the first head, to a tone value of a second color space which corresponds with a color of the liquid;
   a second head including a plurality of nozzles for ejecting the liquid arranged in the predetermined direction, the second head at least partially overlapping the first head when viewed in a direction perpendicular to the predetermined direction;
   a second color conversion table for converting a tone value of the first color space of a pixel, for which the liquid is ejected from the second head, to a tone value of the second color space; and
   a third color conversion table created based on the first color conversion table and the second color conversion table so that, for a pixel of an overlapping portion for which the liquid is ejected from the first head and the second head, a tone value of the first color space is converted to a tone value of the second color space according to the third color conversion table.

2. The liquid ejection device according to claim 1, wherein the third color conversion table is created by averaging a conversion amount according to the first color conversion table and a conversion amount according to the second color conversion table.

3. The liquid ejection device according to claim 1, wherein the third color conversion table is created by weighting a conversion amount according to the first color conversion table and a conversion amount according to the second color conversion table in accordance with a ratio at which the liquid is ejected from the first head and the second head.

4. The liquid ejection device according to claim 3, wherein an ejection ratio of the first head decreases and an ejection ratio of the second head increases from one side to the other side in the predetermined direction in the overlapping portion.

5. The liquid ejection device according to claim 4, wherein the ejection ratio is changed so that in a case in which prescribed nozzles of the overlapping portion of the first head do not eject liquid, more liquid is ejected from the nozzles on the one side than from the prescribed nozzles of the first head, and when the third color conversion table is created, the weighting of the first color conversion table and the second color conversion table is changed in accordance with the ejection ratio that has been changed.

6. A liquid ejection method for a liquid ejection device having a first head in including a plurality of nozzles for ejecting a liquid arranged in a predetermined direction, and a second head including a plurality of nozzles for ejecting the liquid arranged in the predetermined direction, the second head at least partially overlapping the first head when viewed in a direction perpendicular to the predetermined direction, the liquid ejection method comprising:
   converting a tone value of a first color space of a pixel, for which the liquid is ejected from the first head, to a tone value of a second color space corresponding with a color of the liquid, according to a first color conversion table;
   converting a tone value of the first color space of a pixel, for which the liquid is ejected from the second head, to a tone value of the second color space according to a second color conversion table;
   creating a third color conversion table based on the first color conversion table and the second color conversion table; and
   converting a tone value of the first color space for a pixel of an overlapping portion, for which the liquid is ejected from the first head and the second head, to a tone value of the second color space according to the third color conversion table.

* * * * *